INVENTOR.
EARL C. WOODALL
BY A.B.Bowman
ATTORNEY

June 25, 1946.   E. C. WOODALL   2,402,798
INTERNAL-COMBUSTION ENGINE
Filed Oct. 17, 1944   4 Sheets-Sheet 3
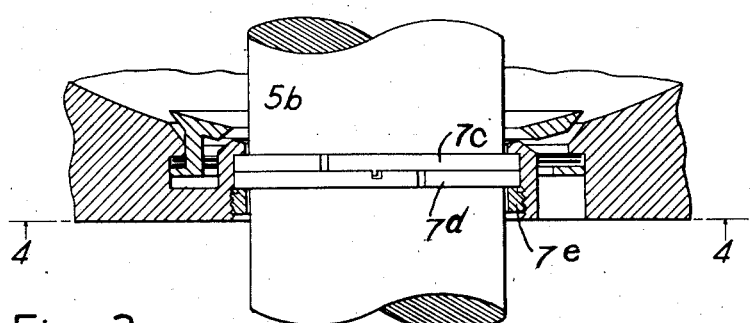
Fig. 3.
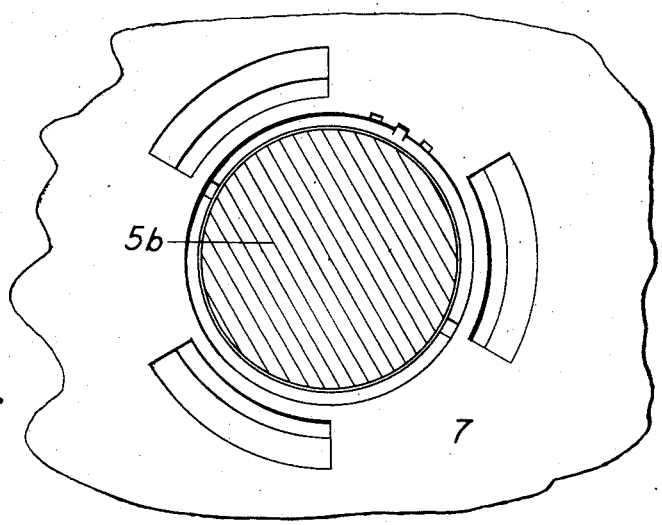
Fig. 4.
Fig. 5.
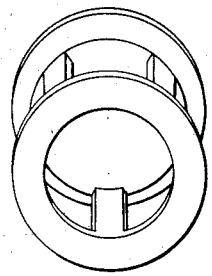
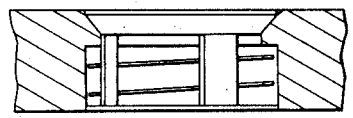
Fig. 6.
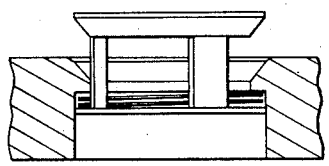
Fig. 7.
INVENTOR.
EARL C. WOODALL
BY
A.B. Bowman
ATTORNEY

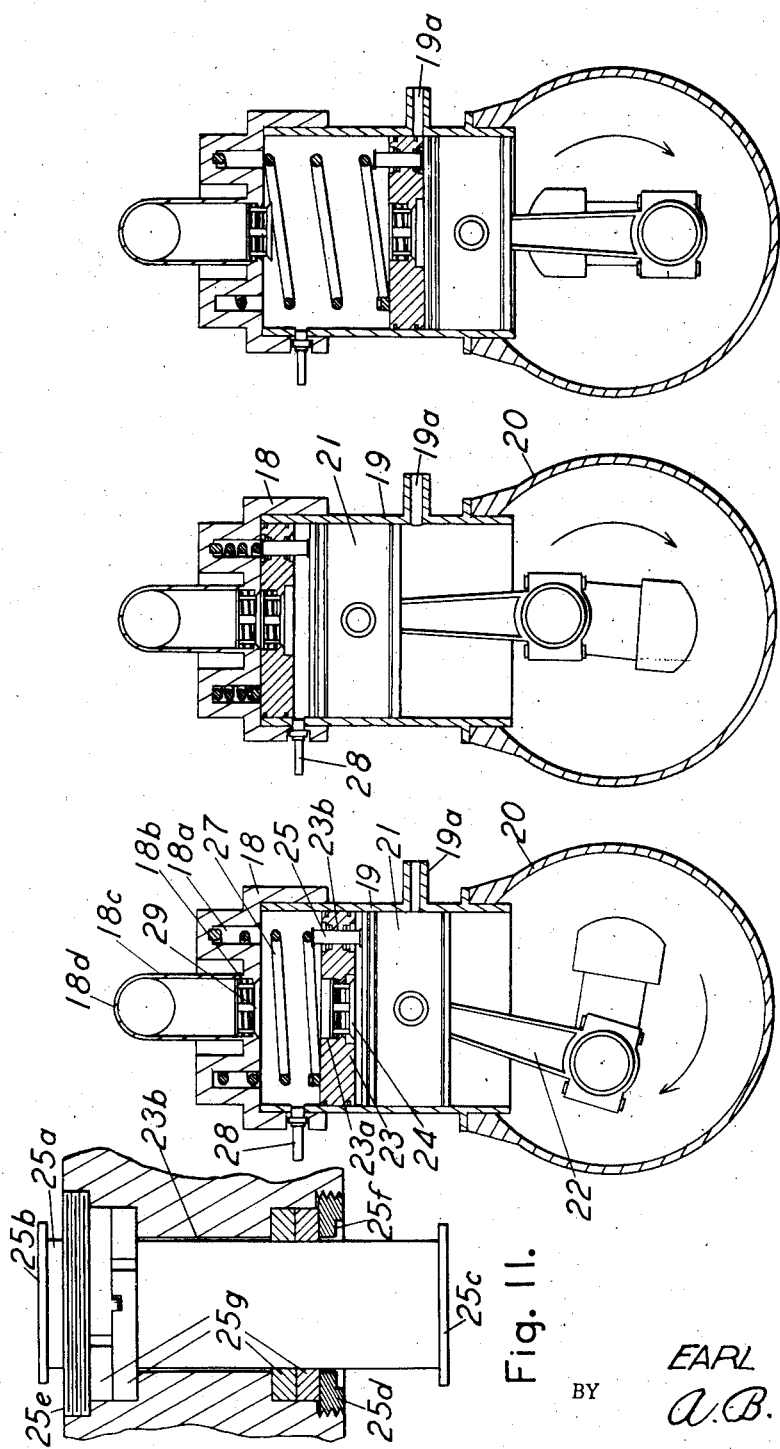

Patented June 25, 1946

2,402,798

UNITED STATES PATENT OFFICE 2,402,798

INTERNAL-COMBUSTION ENGINE

Earl C. Woodall, San Diego, Calif.

Application October 17, 1944, Serial No. 558,983

9 Claims. (Cl. 123—66)

My invention relates to internal combustion engines, more particularly of the two stroke cycle type with auxiliary or secondary pistons and the objects of my invention are:

First, to provide an engine of this class in which the auxiliary or secondary pistons may be automatic in operation with the operation of the main piston and enclosed within the cylinder in which the main piston is operated;

Second, to provide an engine of this class in which the exhaust charge is forced from the cylinder ahead of its auxiliary piston simultaneously with the intake of a fresh charge into the cylinder behind the auxiliary piston;

Third, to provide an engine of this class which provides for complete scavenging of the exhaust gases from the cylinder with each cycle of operation;

Fourth, to provide an engine of this class which is very efficient and will develop a maximum of power within a given cylinder because of the scavenging of the exhaust or burned gases from the cylinder and combustion chamber of the engine;

Fifth, to provide an engine of this class which permits a simpler and relatively strong construction for some of the highly stressed parts of the engine;

Sixth, to provide an engine of this class which provides for a maximum of burning properties of the fuel mixture;

Seventh, to provide a more symmetrical design for modern high speed, high output engines of this class;

Eighth, to provide an engine of this class which reduces to a minimum the overall size of the engine as well as the number of parts required in its construction;

Ninth, to provide an engine of this class which is balanced and symmetrical in design and therefore reduces to a minimum the vibration in the operation of the engine;

Tenth, to provide an engine of this class which is particularly adapted for use for aeronautical or marine engine purposes; and Eleventh, to provide an engine of this class which is very simple and economical of construction, automatic in its action, efficient, durable and which will not readily deteriorate or get out of order.

Figure 1:
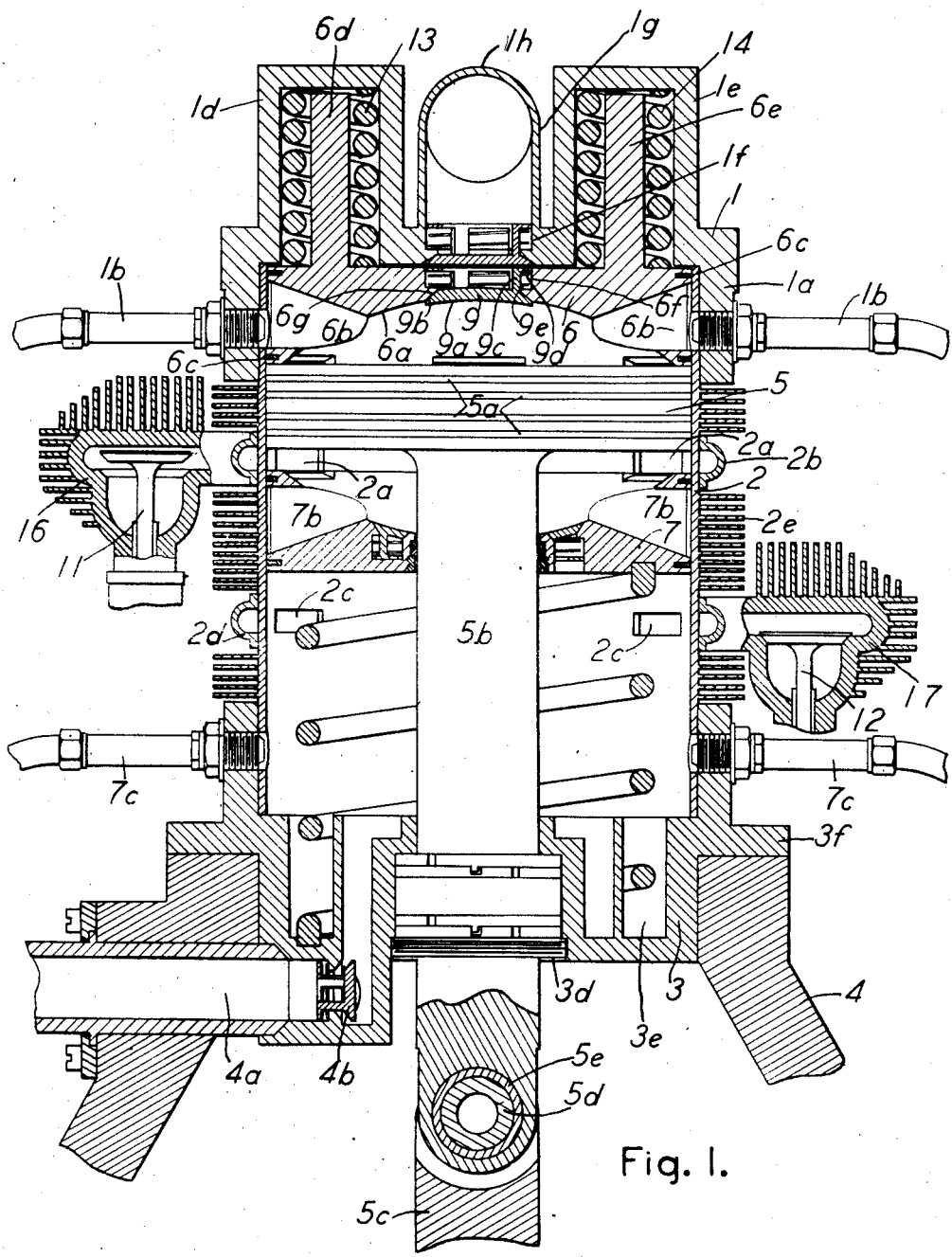
Figure 2:
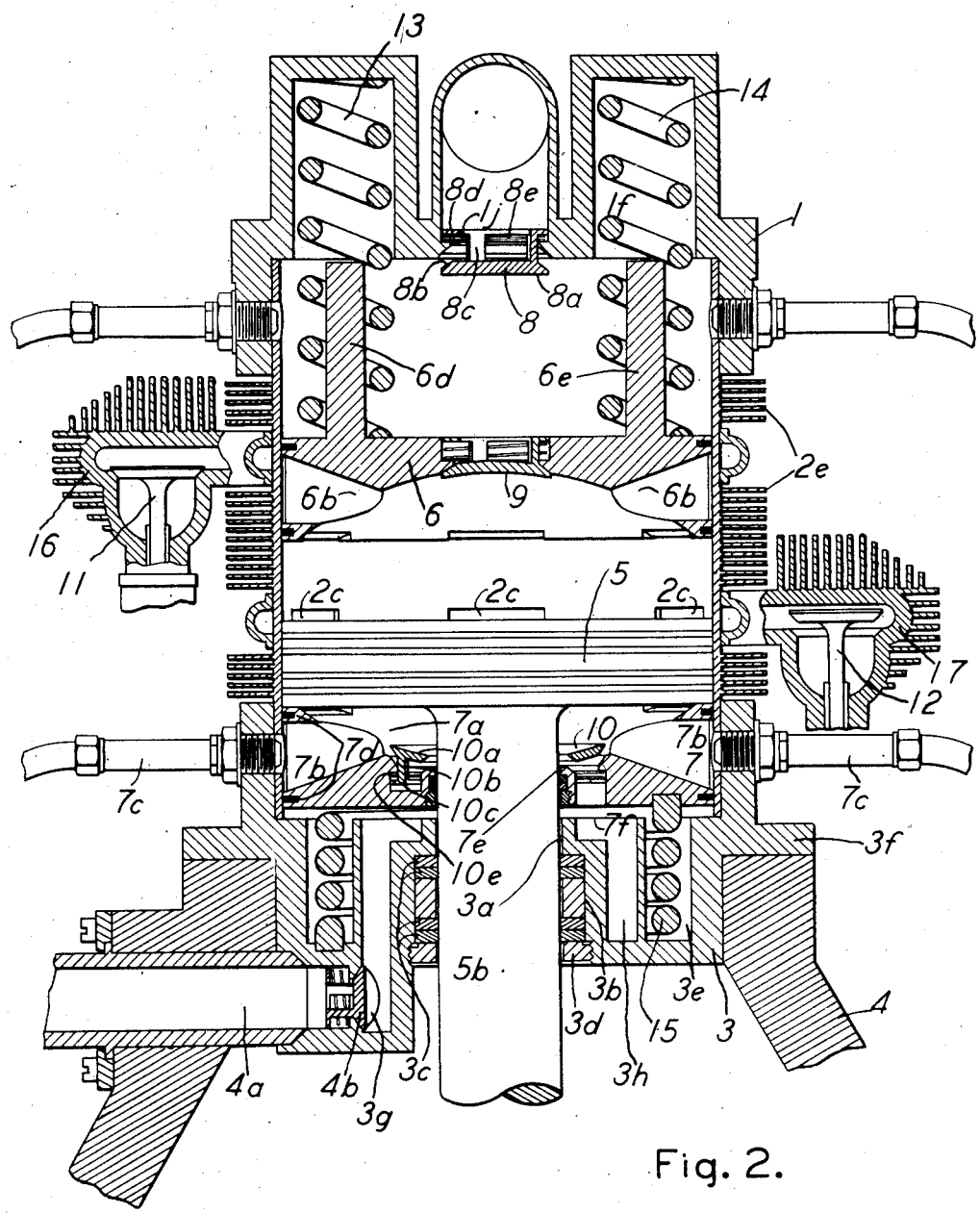

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view through the center of the cylinder of my engine showing the main piston at the extreme upper limit of its drive and showing certain parts and portions in elevation to facilitate the illustration; Fig. 2 is a similar sectional view showing the main piston in the opposed position and near the inward limit of the travel and showing certain parts and portions in elevation to facilitate the illustration; Fig. 3 is an enlarged fragmentary sectional view of the lower auxiliary piston together with its piston valve and sealing ring arrangement around the main piston rod, showing some of the parts in elevation to facilitate the illustration; Fig. 4 is an enlarged fragmentary lower view of the lower auxiliary piston; Fig. 5 is an enlarged detailed perspective view of the valves 8 and 9; Fig. 6 is a side elevational sectional view of the valve shown in Fig. 5 showing it in its closed position against its valve seat; Fig. 7 is a similar sectional view showing the valve in open position; Fig. 8 is a longitudinal sectional view of my engine with the parts in position for compressing the fuel mixture showing some of the parts in elevation to facilitate the illustration showing a modified form of engine constructiton from that of Figs. 1 to 7 inclusive; Fig. 9 is a similar sectional view showing the auxiliary piston and the main piston at the extreme upward limit of the travel at the beginning of the power stroke; Fig. 10 is a similar sectional view with the piston at the extreme lower limit of the travel at the completion of the exhaust action and Fig. 11 shows an enlarged view of the means for permitting the auxiliary piston and the main piston to close the space between them and thereby expel all of the burned gases at the lower section of the cylinder.

Similar characters of reference refer to similar parts and portions of the preferred construction, reference being had to the accompanying drawings made a part thereof.

The cylinder casings 1, 2 and 3, crank case 4, main piston 5, auxiliary pistons 6 and 7, valves 8, 9, 10, 11 and 12, exhaust piston springs 13, 14 and 15, and exhaust valve casings 16 and 17 constitute the principal parts and portions of my engine in its preferred form.

The cylinder casing 1 is substantially a cylinder head. It is provided with an annular extended sleeve portion 1a in which is secured one end of the cylinder casing 2 which is a relatively thin annular cylindrical member and mounted through the sleeve portion 1a and openings in the opposite sides of the member 2 near its upper end are spark plugs 1b on opposite sides. The cylinder casing 2 is preferably provided with cooling fins 2e extending outwardly therefrom around said cylinder, as shown best in Figs. 1 and 2 of the drawings. The casing 1 is provided with a pair of opposed spaced hollow cylindrical members with closed ends 1d and 1e. This casing is also provided centrally with the central opening 1f which is provided with an extended pipe-like portion 1g which extends upwardly between the members 1d and 1e and is provided with a right-angled turn at its upper end at 1h which forms an inlet fuel supply for the engine.

Reciprocably mounted in the upper end of the casing member 2 which forms the engine cylinder is an auxiliary piston 6 which is preferably provided with a concave lower surface 6a and with opposed side passages 6b which are arranged to communicate with the spark plugs 1b when this piston is at the outer end of said cylinder, as shown best in Fig. 1 of the drawings. This piston is provided with sealing rings 6c upon opposite sides of the passages 6b. It is also provided with spaced extended shank portions 6d and 6e which are arranged to reciprocate in the cylindrical casing portions 1d and 1e. Surrounding these shank portions 6d and 6e in the casing portions 1d and and 1e are compression springs 13 and 14 which seat at one of their ends against the heads of the casing members 1d and 1e and at their other end against the auxiliary piston 6, thus tending to force the auxiliary piston inwardly of the cylinder 2 at all times. This auxiliary piston is provided with a central opening 6f. Mounted in this opening 6f is a valve 9 which is provided with a solid disc-like concave portion 9a which conforms with and is substantially a continuation of the concave portion 6a of the piston 6. This portion 6a is provided with a bevelled inner side 6g extending inwardly from the opening 6f which is adapted to form a seat in the auxiliary piston 6 for a conforming portion 9b of the valve 9, as shown best in Fig. 1 of the drawings. This member 9a is provided with a plurality of extending portions 9c, on the extended ends of which is secured an annular ring member 9d and interposed between the portions 9a and 9d is a spring 9e which rests at one side on the portion 6g of the auxiliary piston 6 and at its other side on the ring portion 9d tending to hold the valve in closed position, as shown best in Fig. 1 of the drawings.

Mounted in the opening 1f is a similar valve 8, the solid portion 8a, however, is flat instead of concave. It is provided with a bevelled portion 8b which is adapted to engage an inwardly extending portion 1j which is an integral portion of the casing 1 extending into the opening 1f. It is provided with extended portions 8c on the extended ends of which is secured a ring member 8d. Interposed between the portion 1j and the ring 8d is a compression spring 8e which tends to hold the open ring member 8d in spaced relation from the seat 1j. This valve is shown in open position in Fig. 2 of the drawings and in closed position in Fig. 1.

Reciprocably mounted in the casing member 2 inwardly of the auxiliary piston 6 is the main piston 5 which is provided with conventional sealing rings 5a and with a rigidly connected connecting rod 5b which extends downwardly through the inner end of the cylinder and is pivotally connected with a conventional connecting rod 5c by means of a pin 5d with bushing 5e in conventional manner.

Referring to Fig. 1, immediately inwardly of the inner side of the main piston 5 in the cylinder casing 2, are exhaust ports 2a and surrounding the cylinder 2 over these exhaust ports 2a is an annular shroud 2b which communicates with the exhaust valve casing 16 in which is mounted a conventional valve 11 which serves as an exhaust valve for the exit of the exhausted fuel from the cylinder.

Positioned inwardly some distance in the casing are other exhaust ports 2c over which is positioned a similar annular shroud 2d which communicates with the exhaust valve casing 17 in which is mounted a conventional exhaust valve 12. These exhaust valves 11 and 12 are operated from the crankshaft of the engine in any conventional manner, not shown.

Reciprocably mounted in the cylinder casing 2 inwardly of the main piston 5 is another auxiliary piston 7 which is provided with a concave outer surface 7a with passages 7b arranged to communicate with spark plugs 7c on opposite sides of the cylinder casing 2 and extending through said casing and the cylinder casing 3. This auxiliary piston 7 is provided with sealing members 7d. It is provided with a central opening 7e in which is reciprocably mounted the main piston connecting rod 5b and mounted in this piston 7 surrounding the rod 5b is a valve 10 which includes a solid curved portion 10a with a central opening for the rod 5b with extended connecting portions 10b on the extended ends of which is mounted an annular ring member 10c in an open space between said member 10b and the connecting rod 5b, all as shown best in Fig. 2 of the drawings where the valve is shown in open position and spaced from its seat 7f.

Positioned between the seat portion 7f and the annular member 10c is a spring 10e which tends to hold the valve closed. This valve is shown in its closed position in Fig. 1 of the drawings. It will be here noted that the valve 10 is shown on an enlarged scale together with its connection with the rod 5b in Figs. 3 and 4 of the drawings. The valve 8, which is substantially the same as the valve 9 except that the solid member is flat in the valve 8 and curved in the valve 9. This valve is shown in more detail in Figs. 5, 6 and 7 of the drawings in both closed and open position. Positioned in the auxiliary piston 7 are sealing rings 7c and 7d held in position by a nut 7e.

Secured around the inner end of the casing member 2 is the casing member 3 which is an annular member provided with a central opening 3a which extends around the rod 5b and with a larger opening 3b extending therefrom in which is mounted a packing 3c which serves to prevent leakage around the rod 5b. This packing is secured in position by means of a threaded nut 3d. This casing 3 is provided with an annular groove 3e on its outer side in which is mounted a compression spring 15, one side of which engages the inner side of the auxiliary piston 7 tending to hold said auxiliary piston 7 outwardly at all times. It is shown in its extended position in Fig. 1 of the drawings.

The casing member 3 is provided with an extended flange portion 3f which is arranged to rest against the outer edge of the crankcase 4. Mounted on the outer side of the crankcase 4 and extending inwardly through the wall thereof is an intake port 4a in the inner end of which is mounted a valve 4b which is the same general construction as that shown in Figs. 5, 6 and 7 of the drawings and is mounted in an opening 3g in the casing 3 and communicates with an annular groove 3h which communicates with the interior of the cylinder casing 3 above its connection with the cylinder casing 2.

The operation of my internal combustion engine in the preferred form as shown in Figs. 1 to 7 inclusive in the drawings is substantially as follows:

Considering particularly Fig. 1, shows the main piston at the upper limit of its travel and the gaseous charge above the main piston 5 is in a state of compression. The gaseous charge is ignited by the spark plug 1b and as the charge burns a force is exerted upon the upper surface of the main piston causing the main piston to move downwardly. Thus a power stroke is developed at the completion of which the main piston uncovers the exhaust port 2c and the exhaust valve 12 is opened by means of a push rod assembly in connection with a crank shaft in the conventional manner, not shown. This action relieves the pressure within the chamber above the main piston 5 and the upper auxiliary piston 6 is forced downwardly by the action of the springs 13 and 14. As the main piston completes its downward travel it is contacted by the upper auxiliary piston 6 and this action forces practically all of the burned charge from the combustion chamber above the main piston and out through the exhaust port 2c. Simultaneously with the above action as the upper auxiliary piston starts to move downwardly, the upper intake valve 8 is opened by pressure exerted upon it by the fuel mixture in the upper intake pipe 1g and this fresh intake charge is allowed to flow into the chamber formed above the upper auxiliary piston. The upper auxiliary piston valve 9 in the upper auxiliary piston remains closed throughout this downward movement. The main piston 5 completes its downward movement and as it begins its upward movement, the upper auxiliary piston valve is forced open by the pressure of the fuel mixture above the upper auxiliary piston and this action allows the fresh intake charge to enter the chamber between the upper auxiliary piston and the main piston. This action further scavenges the burned gases by forcing them out of the cylinder exhaust ports 2c. As the upper surface of the main piston 5 reaches a level just above the exhaust port 2c, the exhaust valve 12 closes. The remaining portion of the fresh intake charge is now in the chamber above the upper auxiliary piston 6 and as the main piston travels upwardly forcing the upper auxiliary piston upwardly also, this charge is compressed. This increase in pressure permits the upper intake valve to remain closed and the upper auxiliary piston valve to remain open. When the main piston and the upper auxiliary piston have reached the upper limits of their travels, the charge is in the combustion chamber between the upper auxiliary piston and the main piston and is in the state of compression. When this charge is ignited by the spark plugs 1b a new power stroke is developed. Meanwhile, the same series of events have been taking place in the lower section of the cylinder. Referring to Fig. 1, the chamber between the main piston and the lower auxiliary piston 7 contains a burned charge which is being forced out of the exhaust port 2a past the exhaust valve 11. As the main piston and the lower auxiliary piston come in contact with each other, practically all of the burned charge is expelled from the cylinder. A fresh intake charge is in the chamber below the lower auxiliary piston and as the main piston reaches the top dead center and starts its downward movement, the pressure in the chamber below the lower auxiliary piston permits the lower intake valve 4b to close and the lower auxiliary piston valve 10 to open. The entrance of the fresh intake charge into the chamber between the main piston and the lower auxiliary piston forces out the small amount of burned charge remaining in this chamber. As the main piston and lower auxiliary piston continue their downward movement, the fresh intake charge is compressed and it enters the chamber between the main piston and the lower auxiliary piston, as illustrated in Fig. 2. When the main piston reaches its lower limit of travel, the charge is ignited by the spark plugs 7c. Pressure is exerted in this chamber below the main piston and the main piston is forced upwardly and the new power stroke thus developed. When the main piston uncovers the cylinder exhaust port, the exhaust valve opens and the pressure is relieved within the combustion chamber. The lower auxiliary piston is forced upwardly by the action of the spring 15, the lower auxiliary piston valve remaining closed and the burned charge is forced out of the cylinder. The lower intake valve 4b opens allowing a fresh intake charge to enter the chamber below the lower auxiliary piston through the intake passage 3h in the cylinder casing 3. Thus, the intake charge is admitted into the cylinder, the charge is compressed and ignited, a force exerted on the lower surface of the main piston thus developing a power stroke, and the burned charge forced from the cylinder in a single revolution of the crankshaft corresponding to a two stroke cycle of the engine. This cycle of events takes place on both sides of the main piston 5 in the double acting piston type illustrated in Figs. 1 to 7 of the drawings, during one revolution of the crankshaft or a two stroke cycle of the engine.

It will be here noted that in this structure the ignition passages in the upper and lower pistons permit the ignition of the charge in the combustion chambers before the main piston reaches its upper or lower limit of travel. This process permits a higher pressure to be built up in the combustion chamber which improves the burning properties of the intake charge.

It will be noted that the intake valves and the auxiliary piston valves are so constructed as to permit rapid action and that they are sensitive to slight changes in pressure, changes in the direction of movement of the fluid charge as well as changes in the direction of movement of the supporting body which is the auxiliary piston. Their light weight and occupying a small space cause them to heat properly and rapidly and permits a balanced construction to permit a maximum and uniform quantity of fuel mixture to flow evenly through the valve.

The modified construction shown in Figs. 8 to 11 inclusive of the drawings is substantially as follows:

This is a single acting piston type as distinguished from the double action piston type hereinbefore described. The cylinder head casing 18 fits over the end of a cylinder casing 19 which is fitted into the crankcase 20 at its inner end. A main piston 21 is reciprocably mounted in the cylinder casing 19 and is pivotally connected with a connecting rod 22 which is operated in the conventional manner from the crank case 20 by the conventional crank which is no part of my present invention. Reciprocably mounted in the cylinder casing 19 outwardly of the main piston 21 is an auxiliary piston 23 which is provided with a central opening 23a in which is mounted a valve 24 which is of the same construction as the valve 8 shown in the preferred construction and is seated in the auxiliary piston 23 in the same manner. This piston 23 is also provided with an opening 23b at one side of the center which is provided with a valve 25 which operates at the opposite sides of the auxiliary piston which will be described in detail later. This piston 23 at its outer side is engaged by a compression spring 27 which is seated at its opposite end in a groove 18a in the casing 18 and tends to force the piston 23 inwardly at all times. The casing is provided with a spark plug 28 which communicates with a combustion chamber, which combustion chamber is between the main piston 21 and the auxiliary piston 23 when the pistons are at the outer ends of their stroke as shown in Fig. 9 of the drawings. The casing member 18 is provided with a central opening 18b in which is mounted a valve 29 which is the same as the valve 8, shown in the preferred form of construction and extends at its outer end into a tubular portion 18c in the casing 18 which extends upwardly and turned at right angles at 18d, all of similar construction to the preferred construction shown in Figs. 1 and 2 of the drawings. The casing member 19 is provided with an exhaust port 19a positioned just above the main piston 21 when it is at its inward end of its stroke, as shown best in Fig. 10 of the drawings.

The valve 25, as shown best in Fig. 11 of the drawings is a double valve consisting of a sleeve member 25a which is provided with a flange 25b on one end and 25c at its opposite end. This sleeve 25a it will be noted, is considerably longer than the width of the auxiliary piston 23, as shown best in Fig. 11 of the drawings. This sleeve is reciprocably mounted in an opening 23b in the auxiliary piston 23. Surrounding said sleeve at opposite sides of the piston and screw-threaded in the piston 23 are combined packing nuts and valve seats 25d and 25e provided with grooves 25f in their outer surface adapted to form a seat for the flange 25c when the sleeve valve 25 is shifted from one side to the other in the piston 23. These members 25d and 25e are arranged to retain the packing members 25g around the sleeve for forming a seal packing.

It will be here noted that the spring 27 at one side rests against the outer end of the sleeve valve 25, as shown best in Fig. 8 of the drawings tending to hold said sleeve inwardly in the piston 23.

The operation of the modified construction is substantially as follows: Referring to Fig. 8 of the drawings, as the main piston 21 travels outwardly it bears upon the lower surface of the sleeve member 25, the main piston also bears upon the lower surface of the auxiliary piston during the early part of the upward stroke. However, after the auxiliary piston spring is slightly compressed, it rests at one point on the surface of the upper end of the sleeve member 25a, it being noted that the piston spring 27 is secured at one point at the upper side of the piston 23. As the auxiliary piston spring 27 is compressed into the extending head by the valve member 25, the auxiliary piston is raised upwardly by the spring as it is fastened to the auxiliary piston, thus forming a spacer for the combustion chamber between the two pistons 21 and 23. The Fig. 9 shows the pistons in their relative position at the upper limit of their travel. The fuel mixture in the combustion chamber is in a state of compression and as the charge is ignited, the main piston is forced downwardly, thus developing a power stroke.

Now, referring to Fig. 10 as the main piston uncovers the cylinder exhaust port, the pressure is relieved within the cylinder and the auxiliary piston forced downwardly by the spring in the cylinder head, as can be observed in Fig. 10. The spring does not bear upon the member 25a at the completion of the above action and permits the two pistons to close together and thereby force all of the burned charge out through the exhaust. It will be noted that this type of arrangement is particularly adapted to low compression engines.

Though I have shown and described a particular construction, combination and arrangement in preferred form of a double acting piston type and in modified form the single acting piston type, I do not wish to be limited to the particular construction, either for the preferred or modified structures, but desire to include in the scope of my invention the construction, combination and arrangement substantially as set forth in the appended claims:

Having thus described my invention, what I claim as new and desire to secure by Letters Patent is:

1. In an internal combustion engine of the class described the combination of a cylinder, a main piston reciprocably mounted therein provided with a connecting rod extending from one side thereof, separate independently operated auxiliary pistons reciprocably mounted therein on opposite sides of said main piston and providing a combustion chamber between said main piston and each auxiliary piston, each auxiliary piston provided with a by-pass valve positioned in said piston operable automatically by the movement of said piston one of said by-pass valves surrounding said connecting rod, and a valve in the inlet to said cylinder operable by the movement of one of said auxiliary pistons.

2. In an internal combustion engine of the class described, the combination of a cylinder, a main piston reciprocably mounted therein provided with a connecting rod extending from one side thereof, separate independently operated auxiliary pistons reciprocably mounted therein on opposite sides of said main piston and providing a combustion chamber between said main piston and each auxiliary piston, each auxiliary piston provided with a by-pass valve positioned in said piston operable automatically by the movement of said piston one of said by-pass valves surrounding said connecting rod, a valve in the inlet to said cylinder operable by the movement of one of said auxiliary pistons, and a pair of exhaust ports in said cylinder in spaced relation to each other longitudinally of said cylinder.

3. In an internal combustion engine of the class described, the combination of a cylinder, a main piston reciprocably mounted therein provided with a connecting rod extending from one side thereof and separate independently operated auxiliary pistons reciprocably mounted therein on opposite sides of said main piston providing a combustion chamber between said main piston and each auxiliary piston, each auxiliary piston provided with a by-pass valve positioned in said piston operable automatically by the movement of said piston one of said by-pass valves surrounding said connecting rod, a valve in the inlet to said cylinder operable by the movement of one of said auxiliary pistons, a pair of exhaust ports in said cylinder in spaced relation to each other longitudinally of said cylinder, and an automatic valve in the inlet to the inner side of said cylinder.

4. In an internal combustion engine of the class described, the combination of a cylinder, a main piston reciprocably mounted therein provided with a connecting rod extending from one side thereof and separate independently operated auxiliary pistons reciprocably mounted therein on opposite sides of said main piston providing a combustion chamber between said main piston and each auxiliary piston, each auxiliary piston provided with a by-pass valve positioned in said piston operable automatically by the movement of said piston one of said by-pass valves surrounding said connecting rod, a valve in the inlet to said cylinder operable by the movement of one of said auxiliary pistons, a pair of exhaust ports in said cylinder in spaced relation to each other longitudinally of said cylinder, an automatic valve in the inlet to the inner side of said cylinder, and ignition means at the opposite ends of said cylinder communicating with said combustion chambers.

5. In an internal combustion engine of the class described, the combination of a cylinder, a main piston reciprocably mounted therein, auxiliary pistons reciprocably mounted therein on opposite sides of said main piston, each auxiliary piston provided with a by-pass valve positioned in said piston operable automatically by the movement of said piston, a valve in the inlet to said cylinder operable by the movement of one of said auxiliary pistons, a pair of exhaust ports in said cylinder in spaced relation to each other longitudinally of said cylinder, an automatic valve in the inlet to the inner side of said cylinder, ignition means at the opposite ends of said cylinder, said auxiliary pistons provided with passages communicating with said ignition means.

6. In an internal combustion engine of the class described, the combination of a cylinder, a main piston reciprocably mounted therein, auxiliary pistons reciprocably mounted therein on opposite sides of said main piston, each auxiliary piston provided with a by-pass valve positioned in said piston operable automatically by the movement of said piston, a valve in the inlet to said cylinder operable by the movement of one of said auxiliary pistons, a pair of exhaust ports in said cylinder in spaced relation to each other longitudinally of said cylinder, an automatic valve in the inlet to the inner side of said cylinder, ignition means at the opposite ends of said cylinder, said auxiliary pistons provided with passages communicating with said ignition means, and spring means tending to hold each of said auxiliary pistons toward said main piston.

7. In an internal combustion engine of the class described, the combination of a cylinder, a main piston reciprocably mounted therein provided with a connecting rod extending from one side thereof, an auxiliary piston in said cylinder outwardly of said main piston, automatic valve means in said auxiliary piston surrounding said connecting rod, another valve means automatically operated by said auxiliary piston for admitting fluid to said cylinder at its outer end, spring means in connection with said auxiliary piston one of said by-pass valves surrounding said connecting rod tending to hold said auxiliary piston toward said main piston, and means tending to hold said piston in certain spaced relation to each other in certain movements of the main piston.

8. In an internal combustion engine of the class described, the combination of a cylinder, a main piston reciprocably mounted therein provided with a connecting rod extending from one side thereof, an auxiliary piston in said cylinder outwardly of said main piston, automatic valve means in said auxiliary piston surrounding said connecting rod, another valve means automatically operated by said auxiliary piston for admitting fluid to said cylinder at its outer end, means tending to hold said pistons one of said by-pass valves surrounding said connecting rod in certain spaced relation to each other in certain movements of the main piston, and means tending to hold said auxiliary piston inwardly in said piston.

9. In an internal combustion engine of the class described, the combination of a cylinder, a main piston reciprocably mounted therein provided with a connecting rod extending from one side thereof, an auxiliary piston in said cylinder outwardly of said main piston, automatic valve means in said auxiliary piston surrounding said connecting rod, another valve means automatically operated by said auxiliary piston for admitting fluid to said cylinder at its outer end, means tending to hold said pistons one of said by-pass valves surrounding said connecting rod in certain spaced relation to each other in certain movements of the main piston, means tending to hold said auxiliary piston inwardly in said piston, and exhaust ports in connection with said cylinder positioned at the juncture of the main piston with the auxiliary piston when at the outer end of the stroke.

EARL C. WOODALL.